United States Patent
Lee et al.

(10) Patent No.: US 7,486,323 B2
(45) Date of Patent: Feb. 3, 2009

(54) PORTABLE ELECTRONIC DEVICE FOR CHANGING MENU DISPLAY STATE ACCORDING TO ROTATING DEGREE AND METHOD THEREOF

(75) Inventors: Woo-jong Lee, Suwon-si (KR); Sang-on Choi, Suwon-si (KR); Woo-jong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 11/067,207

(22) Filed: Feb. 28, 2005

(65) Prior Publication Data

US 2005/0190281 A1    Sep. 1, 2005

(30) Foreign Application Priority Data

Feb. 27, 2004    (KR) ............... 10-2004-0013660

(51) Int. Cl.
H04N 5/222    (2006.01)
(52) U.S. Cl. .................. 348/333.12; 348/239
(58) Field of Classification Search ........... 348/333.02, 348/333.12, 239, 207.99
See application file for complete search history.

(56) References Cited

U.S. PATENT DOCUMENTS

| 5,640,627 | A | 6/1997 | Nakano et al. | |
|---|---|---|---|---|
| 5,953,683 | A | * | 9/1999 | Hansen et al. ............... 702/95 |
| 6,262,769 | B1 | | 7/2001 | Anderson et al. |
| 6,982,697 | B2 | * | 1/2006 | Wilson et al. ............... 345/156 |
| 2003/0098847 | A1 | | 5/2003 | Yamamoto |
| 2004/0070611 | A1 | * | 4/2004 | Tanaka et al. ............... 345/757 |
| 2005/0143124 | A1 | * | 6/2005 | Kennedy et al. ......... 455/556.1 |

FOREIGN PATENT DOCUMENTS

| EP | 1 124 175 A2 | 8/2001 |
|---|---|---|
| EP | 1 148 459 A2 | 10/2001 |
| EP | 1 298 890 A2 | 4/2003 |
| EP | 1314961 A2 | 5/2003 |
| GB | 2 358 515 A | 7/2001 |
| JP | 2003-162277 A | 6/2003 |
| JP | 2003-197055 A | 7/2003 |

* cited by examiner

*Primary Examiner*—Tuan V Ho
(74) *Attorney, Agent, or Firm*—Sughrue Mion, PLLC

(57) ABSTRACT

A video pick device for displaying a menu in a fixed position regardless of its rotation state. The photographing device comprises a geomagnetic sensor for detecting a predetermined output value corresponding to a geomagnetism; a display unit for displaying a predetermined menu through a display panel; and a control unit for checking the output value detected by the geomagnetic sensor to determine a pickup position, and controlling the display unit to have a display state of the menu changed in response to the determined pickup position. Accordingly, the menu display state on the display panel is changed in response to respective pickup positions to be displayed with the same form in a fixed direction with respect to the surface of the earth.

13 Claims, 7 Drawing Sheets

PORTABLE ELECTRONIC DEVICE FOR CHANGING MENU DISPLAY STATE ACCORDING TO ROTATING DEGREE AND METHOD THEREOF

CROSS-REFERENCE TO RELATED APPLICATIONS

This application claims priority from Korean Patent Application No. 2004-13660 filed on Feb. 27, 2004 with the Korean Intellectual Property Office, the entire content of which is incorporated herein by reference.

BACKGROUND OF THE INVENTION

1. Field of the Invention

The present invention relates generally to a portable electronic device having a built-in geomagnetic sensor. More particularly, the present invention relates to a portable electronic device of determining a rotation state by means of a geomagnetic sensor and rotating a menu to be displayed on a screen based on the determination, and a method for the same.

2. Description of the Related Art

As electronic technologies have been developed, various portable electronic devices such as a cellular phone, a Personal Digital Assistant (PDA), a notebook, a Personal Computer (PC) or the like have been developed and have become popular. In particular, companies that manufacture such portable electronic devices are inciting users to buy products by adding various and handy functions to the portable electronic devices in recent years. By way of example, a camera function is added to the cellular phone to allow a simple picture or a moving picture to be picked up, or an acceleration sensor or a gyro sensor is built in the portable electronic device to allow a current inclination state or a rotational angular velocity or the like to be measured so that users may obtain various information. The acceleration sensor serves to use a signal corresponding to a change of acceleration of gravity to thereby obtain positional information, and the gyro sensor serves to measure a Coriolis force to detect the rotational angular velocity.

FIGS. 1A and 1B are schematic diagrams of a camera phone 10 which has rapidly become popular in recent years as an example of portable electronic devices. Users check the images displayed on a Liquid Crystal Display (LCD) 11 of the camera phone 10, and adjust various buttons 12 to carry out the pickup.

The users may carry out the pickup not in a typical longitudinal direction but in a horizontal direction. In other words, the users may usually carry out the pickup in the longitudinal direction as shown in FIG. 1A, however, the users may carry out the pickup in the horizontal direction by rotating the camera phone 10 by 90° as shown in FIG. 1B. In this case, the image which is incident through a lens to be displayed on the LCD 11 is maintained as it is, however, an On Screen Display (OSD) menu 11b such as "pickup", "send" or a current mode display 11a of the camera phone such as "take a picture" which are to be displayed on the screen of the camera phone 10 is rotated along with the camera phone 10. As a result, these menu displays are represented in the longitudinal direction, which causes the users to feel inconvenience.

As an alternative, the acceleration sensor or the gyro sensor may be built in the cellular phone to allow the menu being displayed on the screen after measurement of the rotation state to be rotated, however, the acceleration sensor relatively consumes a large amount of power and has less durability against impact, and the gyro sensor also has lees durability against impact and costs too much. Also, both the accelerator sensor and the gyro sensor are difficult to manufacture small enough to be employed in the portable electronic device.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

It is therefore one aspect of the present invention to provide a portable electronic device capable of determining its rotation state by means of a geomagnetic sensor and rotating a menu display to be displayed on a screen based on this determination, and a method for the same.

According to one aspect of the present invention, there is provided a photographing device which comprises a geomagnetic sensor for detecting a predetermined output value corresponding to a geomagnetism; a control unit for checking the output value detected by the geomagnetic sensor to determine a pickup position; and a display unit for displaying a predetermined menu through a display panel and changing the state of the menu so as to correspond to the pickup position. In this case, the display state can include a display position, a display angle, and so forth.

The geomagnetic sensor can include a geomagnetism detection module including an X-axis fluxgate and a Y-axis fluxgate orthogonal to each other and detecting an electrical signal corresponding to a geomagnetism of each of the fluxgates; a signal processing unit for converting the electrical signal output from each of the X and Y-axis fluxgates to respective predetermined output values of the X and Y-axes and outputting them; and a geomagnetism calculation unit for normalizing the output values of the X and Y-axes to values in respective predetermined ranges.

The control unit may check magnitudes of the output values of the X and Y-axes and determine that there is a pickup position corresponding to a predetermined condition when the magnitudes meet the predetermined condition.

The control unit preferably uses the magnitude information of the output values of the X and Y-axes as the condition under respective pickup positions which are in advance extracted by measuring the output values of the X and Y-axes while changing the pickup positions of the photographing device.

The geomagnetic sensor may be preferably mounted so as to have the X-axis fluxgate and the Y-axis fluxgate formed in a pickup direction of the photographing device and in a direction perpendicular to the pickup direction of the photographing device, respectively.

In this case, the control unit may determine that the pickup position is in a longitudinal pickup direction when the output value of the Y-axis is greater than that of the X-axis and the output value of the X-axis is smaller than a first predetermined threshold value, and may determine that the pickup position is in a left horizontal pickup direction when the output value of the Y-axis is greater than that of the X-axis and a second predetermined threshold value. In addition, the control unit may determine that the pickup position is in a right horizontal pickup direction when the output value of the X-axis is greater than that of the Y-axis and the output value of the Y-axis is smaller than a third predetermined threshold value.

In accordance with the photographing device of the present invention, the display unit preferably changes the position of the menu display to correspond to the change of the pickup position, and displays the menu with the same form on the display panel in a fixed direction with respect to the surface of the earth. In this case, the menu displays a current mode display, various selectable menus or the like, and may be displayed as an On Screen Display (OSD) form.

In accordance with another embodiment of the present invention, the geomagnetic sensor may be employed in the portable electronic device such as a PDA, a notebook, and a PC which do not have a photographing function, so that the degree of the current inclination may be determined and the menu position for various menus to be displayed on the screen may be changed when it is determined that there is a horizontal or longitudinal inclination, which may allow the menu display to be displayed with the same form in the fixed direction all the time.

According to another aspect of the present invention, there is provided a method for displaying a menu in a photographing device, which includes (a) using the two axis fluxgates to detect a predetermined output value corresponding to a geomagnetism; (b) checking whether the output value meets a predetermined condition to determine the pickup position of the photographing device; and (c) displaying the menu on the display panel, and changing a display state of the menu in response to the pickup position to display the OSD menu with the same form on the display panel in a fixed direction based on the surface of the earth.

The (a) operation can include detecting an electrical signal corresponding to a geomagnetism from the two axis fluxgates; converting the electrical signal output from each of the X and Y-axis fluxgates to respective predetermined output values of the X and Y-axes and outputting them; and normalizing the output values of the X and Y-axes to values in respective predetermined ranges.

The (b) operation can include using the magnitude information of the output values of the X and Y-axes and its correlation information as the condition under respective pickup positions which can be extracted, in advance, by measuring the output values of the X and Y-axes while changing the pickup position of the photographing device.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, the present invention will be described in detail with reference to illustrative accompanying drawings.

Figure 1A:
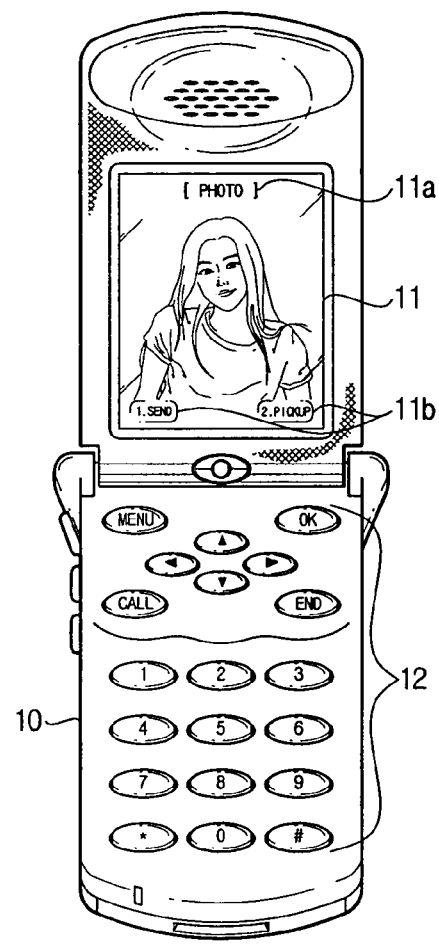
FIGS. 1A and 1B are schematic diagrams depicting a pickup procedure using a conventional camera phone.
Figure 1B:
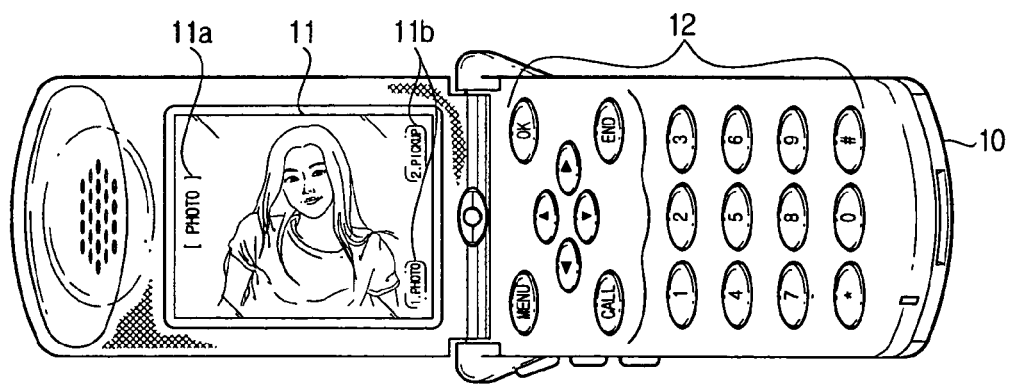
Figure 2:
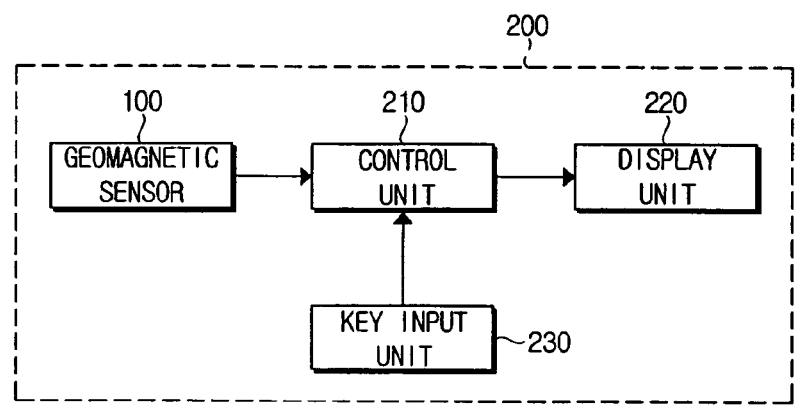
FIG. 2 is a block diagram of a portable electronic device in accordance with an exemplary embodiment of the present invention.

FIG. 2 is a block diagram of a portable electronic device in accordance with an exemplary embodiment of the present invention. Referring to FIG. 2, the portable electronic device includes a geomagnetic sensor 100, a control unit 210, a display unit 220, and a key input unit 230.

The geomagnetic sensor 100 serves to measure intensity and direction of a terrestrial magnetism which a user cannot feel, and to detect them as predetermined output values. A sensor which serves to measure the geomagnetism using a fluxgate is generally called a fluxgate type geomagnetic sensor. The fluxgate type geomagnetic sensor means a device, which employs as its magnetic core a material such as a permalloy having a high permeability, wherein an excited magnetic field is applied through a driving coil on which the core is wound to measure secondary harmonic components proportional to an external magnetic field generated in response to the magnetic saturation and the non-linearity magnetic characteristics of the core. It measures the intensity and the direction of the external magnetic field to thereby detect a current azimuth angle, which in turn allows the degree of rotation to be measured.

Figure 3:
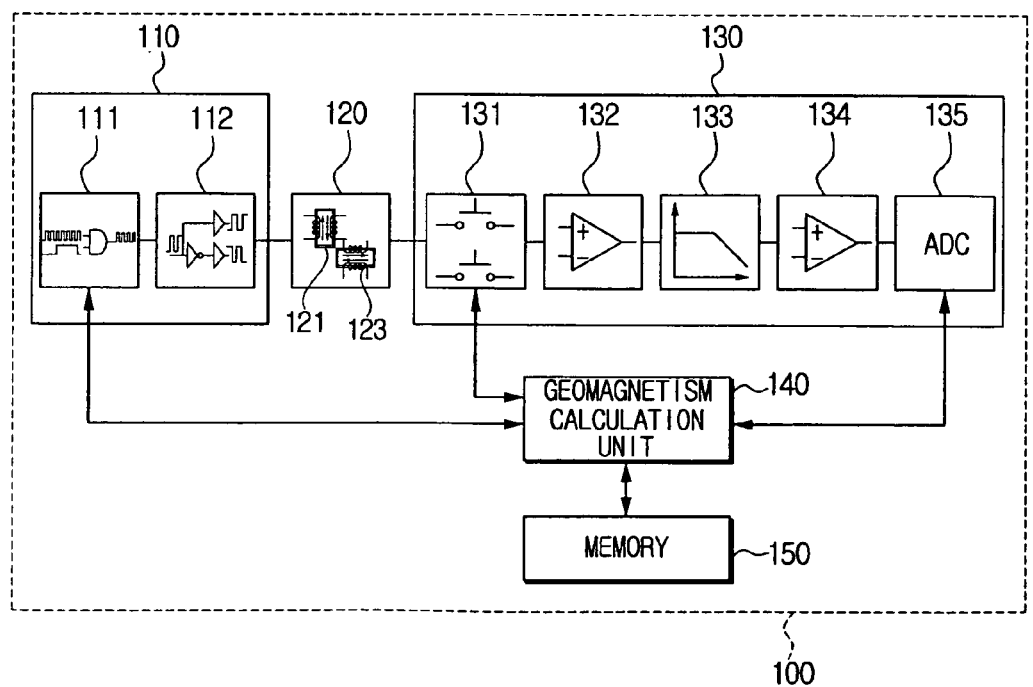
FIG. 3 is a block diagram of a geomagnetic sensor employed in the portable electronic device of FIG. 2.

FIG. 3 is one example of the geomagnetic sensor 100 shown in FIG. 2, and is a block diagram of the geomagnetic sensor employing two axis fluxgates. Referring to FIG. 3, the present geomagnetic sensor 100 includes a driving signal generation unit 110, a geomagnetism detection module 120, a signal processing unit 130, a geomagnetism calculation unit 140, and a memory 150. The driving signal generation unit 110 serves to generate and output a driving signal for driving the geomagnetism detection module 120. A pulse waveform and a reverse pulse waveform may be employed for the driving signal. In other words, the driving signal generation unit 110 can include a pulse generator (not shown), a pulse limiting unit 111, and a pulse amplifying unit 112, and the pulse limiting unit 111 selectively carries out switching of the pulse waves based on the control signal when the pulse waves are output from the pulse generator, and amplifies and inverts the pulse waves to be output. An AND-gate may be used as the pulse limiting unit 111, which outputs the pulse output from the pulse generator in accordance with the control signal applied at one end of the AND-gate.

The pulse amplifying unit 112 uses several amplifiers and inverters to apply, to the geomagnetism detection module 120, two pulse signals which have phases opposite to each other with respect to the pulse output from the pulse limiting unit 111.

The geomagnetism detection module 120 serves to output a predetermined electrical signal corresponding to the magnetism when the driving signal is applied from the driving signal generation unit 110. Referring to FIG. 3, the X and Y-axis fluxgates 121 and 123 are displaced such that two rectangular ring shaped magnetic cores are positioned to have respective longitudinal directions in X and Y directions, and the driving coil and the detection coil are wound on the magnetic cores of the two fluxgates, respectively. Accordingly, when the driving signal is applied to each driving coil, magnetism occurs to the X and Y-axis fluxgates 121 and 123, which in turn allows the induced electromotive force to be detected by the detection coil.

Figure 4:
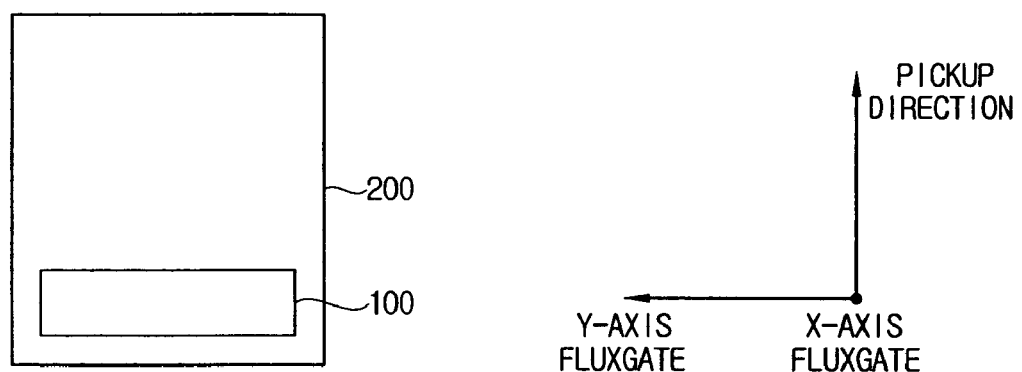
FIG. 4 is a schematic diagram illustrating a direction in which the geomagnetic sensor is mounted in the portable electronic device of FIG. 2.

FIG. 4 illustrates installation directions of the X and Y-axis fluxgates 121 and 123 and a pickup direction when the portable electronic device 200 having the built-in geomagnetic sensor 100 is a photographing device. Referring to FIG. 4, the geomagnetic sensor 100 may be mounted in the photographing device so as to have the pickup direction of the photographing device 200, and the X and Y-axis fluxgates 121 and 123 perpendicular to one another. In this case, each of the X and Y-axis fluxgates 121 and 123 within the geomagnetic detection module 120 may be displaced in any directions required by the manufacturer.

Each output value detected from the X and Y-axis fluxgates 121 and 123 changes in response to an inclination. The inclination may be represented as a pitch angle, a roll angle, and a yaw angle. When the pickup direction is the Z axis in FIG. 4, the pitch angle indicates an angle between the Z axis and a plane formed by the Y-axis fluxgate when the photographing device 200 is rotated based on the Y-axis fluxgate, and the roll angle indicates an angle between the Z axis and a plane formed by the X-axis flux gate when the photographing device is rotated based on the X-axis fluxgate. And the yaw angle indicates an angle between the X-axis fluxgate and the Y-axis fluxgate when the photographing device is rotated based on the Z axis.

The signal processing unit 130 serves to convert the induced electromotive force detected from each of the X and Y-axis fluxgates 121 and 123 to a predetermined digital value through a constant procedure, and to output the digitized value. To detail this, the signal processing unit 130 includes a chopping circuit 131, a first amplifier 132, a filter 133, a second amplifier 134, and an A/D (analog-to-digital) converter 135. The chopping circuit 131 controls several built-in switches to chop the electrical signal which is output from the geomagnetism detection module 120 and induced to the X and Y-axis fluxgates. The chopped electrical signal is differentially amplified by the first amplifier 132 and filtered out by the filter 133 so as to have the signal present only in a predetermined range, which is finally amplified by the second amplifier 134. The amplified signal is converted by the A/D converter 135 and output as a digital voltage value.

The geomagnetism calculation unit 140 carries out a normalization procedure of mapping the actual output value output from the signal processing unit 130 to a predetermined range. To this end, a manufacturer of the geomagnetic sensor 100 in advance measures the output values of the X and Y-axis fluxgates 121 and 123 while rotating the geomagnetic sensor 100 at least one time in its horizontal state. When the measurement is completed, the minimum and the maximum values among the measured output values are selected, which are then recorded on the memory 150.

The geomagnetism calculation unit 140 carries out the normalization by substituting parameters of the formula below with the maximum and the minimum values recorded on the memory 150 and the X and Y-axis output values detected from the signal detection unit 130.

$$nX = \frac{(X - X_{bias})}{X_{scale}},$$ [Formula 1]

$$X_{bias} = \frac{(X_{max} + X_{min})}{2}, \quad X_{scale} = \frac{(X_{max} - X_{min})}{2}$$

-continued $$nY = \frac{(Y - Y_{bias})}{Y_{scale}},$$

$$Y_{bias} = \frac{(Y_{max} + Y_{min})}{2}, \quad Y_{scale} = \frac{(Y_{max} - Y_{min})}{2}$$

Referring to the formula 1, X and Y indicate the output values of the X and Y-axis fluxgates 121 and 123, respectively, nX and nY indicate the normalization values of the X and Y-axes, respectively, Xmax and Xmin indicate the maximum and the minimum values of the X-axis, respectively, and Ymax and Ymin indicate the maximum and the minimum values of the Y-axis, respectively. The geomagnetism calculation unit 140 substitutes the parameters of the formula 1 with the Xmax, Xmin, Ymax, and Ymin which are measured and recorded on the memory 150 to calculate the Xbias, Xscale, Ybias, and Yscale, and uses the resultant values again to calculate nX and nY.

Figure 5:
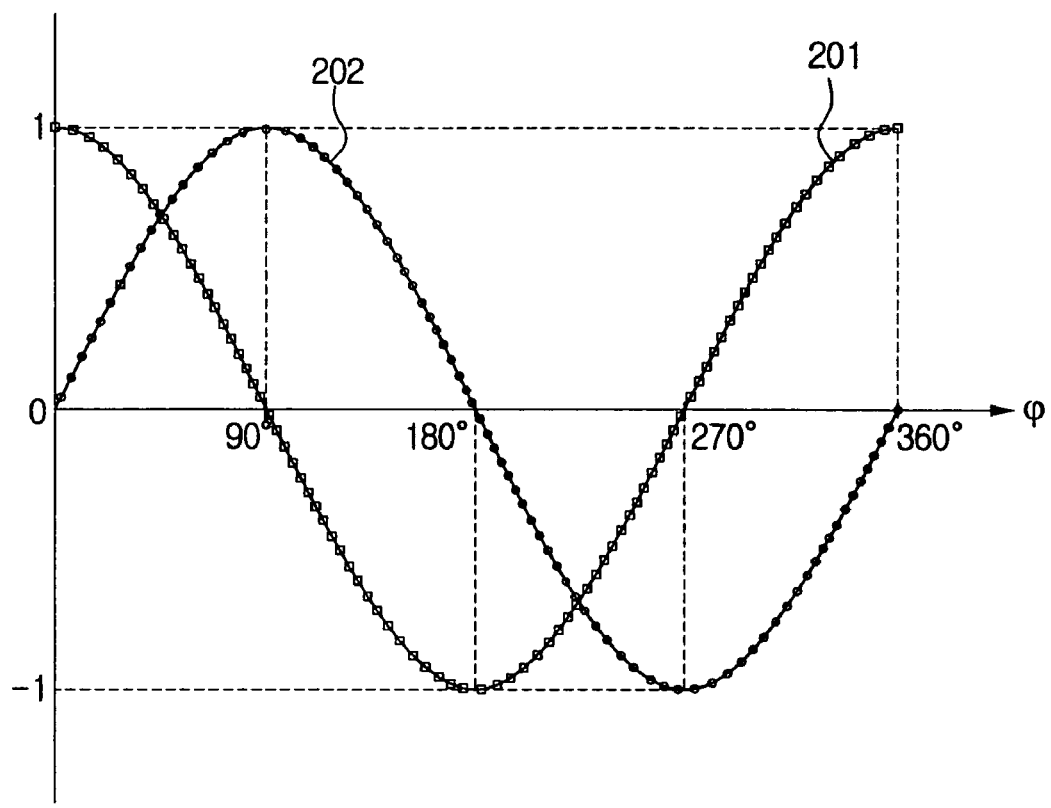
FIG. 5 is a graph illustrating output values of the geomagnetic sensor of FIG. 3.

FIG. 5 is a graph of output values of the normalized X and Y-axis fluxgates 121 and 123 in the geomagnetism calculation unit 140 which were measured in a horizontal state (namely, the pitch angle=the roll angle=0°). Referring to FIG. 5, the normalized voltage value of the X-axis fluxgate 121 represents a cosine waveform 201, and the normalized voltage value of the Y-axis fluxgate 123 represents a sine waveform 202. Each graph has a value in a range of ±1, and is changed in response to the change of the yaw angle $\psi$.

When the output values of the X and Y-axis fluxgates are detected from the geomagnetic sensor 100 through the above-mentioned procedure, the control unit 210 checks each magnitude of the output values to determine whether the magnitude meets a predetermined condition. As a result, when the magnitude meets the predetermined condition, the control unit 210 determines that a predetermined state corresponding to the condition is present.

To detail this, the control unit 210 recognizes a first state corresponding to a current first condition when the detected output value meets the first condition. As a result, the control unit 210 controls the display unit 220 to change the display position and the display state of various menu displays being currently displayed on a display panel (not shown). The display unit 220 serves to display various menus as OSD forms by using a predetermined display panel such as an LCD panel or the like. As a result, even when the portable electronic device 200 has been rotated in any directions, various menus may be displayed in a fixed position based on the absolute value of the azimuth angle information. In other words, various menus may be displayed on constant positions in fixed directions (that is, a surface direction of the earth, a celestial direction, a right direction, and a left direction) with respect to the surface of the earth.

Accordingly, the users may select a proper menu by adjusting the key input unit 230. The key input unit 230 means one which includes numeric keys, direction keys, and an enter key.

The manufacturer of the portable electronic device 200 in advance checks the values output from the geomagnetic sensor 100 while rotating the portable electronic device 200 at various angles. As a result, when the manufacturer finds the specific information corresponding to each rotation state, he/she records the information to allow the control unit 210 to employ the specific information as the predetermined condition.

In this case, the output value characteristics may be varied in response to the direction of mounting the X and X-axis fluxgates 121 and 123 when the geomagnetic sensor 100 is mounted in the portable electronic device 200. To detail this, in the case that the geomagnetic sensor 100 is mounted in the portable electronic device, specifically, in the photographing device 200, when each of the X and Y-axis flux gates 121 and 123 is mounted to be perpendicular to the pickup direction as shown in FIG. 4, the X-axis indicates a direction perpendicular to the surface of the earth in a normal pickup state (that is, longitudinal pickup position), so that the pitch angle becomes about 90° to about 80° even when the portable electronic device 200 is in a horizontal state. The users carry out the pickup in various directions while maintaining the longitudinal pickup position, so that the roll angle changes in a range of 0° to 360°.

Alternatively, when the pickup is carried out in a horizontal pickup position while the photographing device 200 is rotated to a left direction, the X-axis fluxgate 121 becomes parallel to the surface of the earth to be positioned in the left position and the Y-axis fluxgate 123 becomes vertical to the surface of the earth to be positioned toward the surface in the case that the geomagnetic sensor 100 is mounted in the direction as shown in FIG. 4. Accordingly, the roll angle maintains in a range of about 90° to about 80°, and the pitch angle may change in a range of 0° to 360° because the user may rotate based on the Y-axis. As a result, the output values of the X and Y-axes are differently detected based on the inclination, which is preferably taken into consideration to set the condition.

The present invention may be applied to a photographing device capable of carrying out the pickup such as a digital camera or a camera phone. When the user carries out the pickup for the video using the photographing device, he/she generally does the photographing in a longitudinal pickup position, however, may often carry out the photographing in a horizontal pickup position by rotating the photographing device 200 to the right or left direction with respect to the pickup direction (Z axis) of the photographing device 200.

Figure 6A:
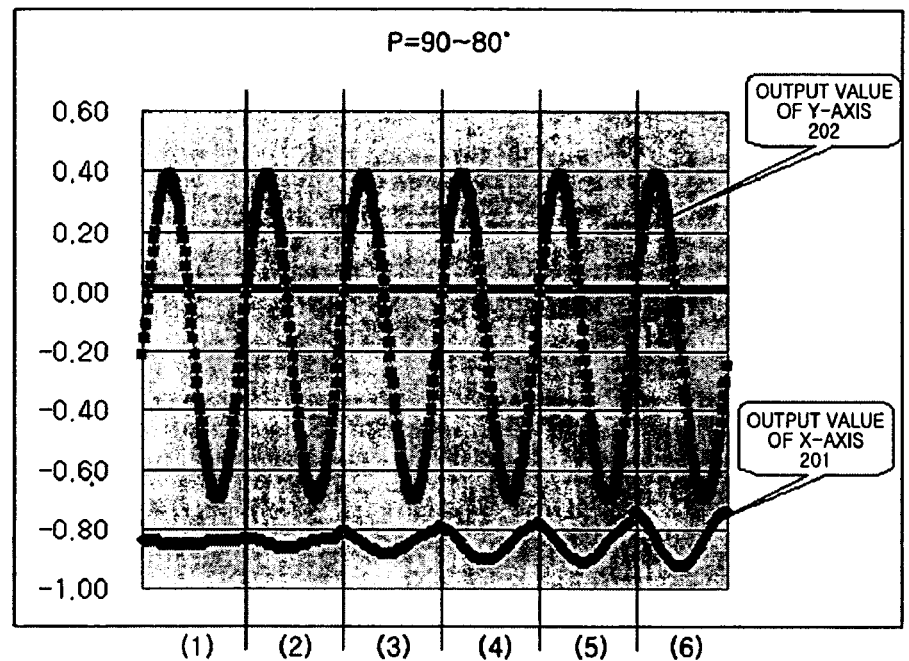
FIGS. 6A and 6B illustrate graphs of the detected output values of the X and Y-axes when the geomagnetic sensor 100 is mounted in a direction vertical to the photographing device.
Figure 6B:
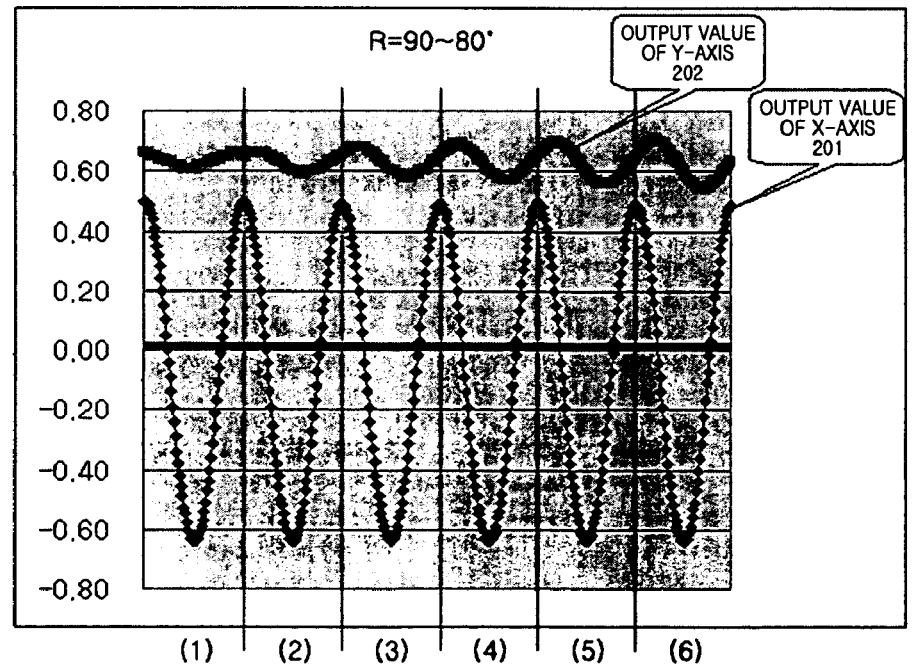

FIGS. 6A and 6B illustrate graphs of the detected output values of the X and Y-axes when the geomagnetic sensor 100 is mounted in a direction vertical to the photographing device. FIG. 6A is a graph of a detected pitch angle in a range of 90° to 80° in the longitudinal pickup position, and FIG. 6B is a graph of a detected roll angle in a range of 90° to 80° in the left horizontal pickup position. As the X and Y-axis fluxgates are displaced as shown in FIG. 4, it can be seen that the detected output value of the Y-axis is always higher than that of the X-axis in FIGS. 6A and 6B.

Referring to FIG. 6A, in a first section of the pitch angle of 90°, the output value of the X-axis substantially maintains −0.8, however, the output value of the Y-axis has its roll angle changed in a range of 0° to 360° so that it is represented as a sine waveform which oscillates in a range of +0.4 to −0.7 because of the roll angle change in the range of 0° to 360°. When the measurement continues while the pitch angle is repeatedly changed by 2°, the output value of the X-axis changes a little through a second section of the pitch angle of 88° and a third section of the pitch angle of 86°, and becomes detected as a cosine waveform to some extent in a sixth section of the pitch angle of 80°. As a result, in any inclination range of allowing the longitudinal pickup, (1) the output value of the Y-axis is always higher than that of the X-axis, and (2) the output value of the X-axis is lower than a first predetermined threshold value. This threshold value may be experimentally set to about −0.5 on a graph.

FIG. 6B is a graph of a detected roll angle changing in a range of about 90° to about 80° while the present geomagnetic sensor 100 is rotated in the left direction. Referring to FIG. 6B, variation of the output value of the X-axis is high, however, the output value of the Y-axis is displayed as substantially a constant value in a first section of the roll angle of 90°, and the output value of the Y-axis changes a little through a second section of the roll angle of 88° and a third section of the roll angle of 86°, and becomes detected as a sine waveform to some extent in a sixth section of the roll angle of 80°. As a result, the output values of the geomagnetic sensor 100 which is rotated in a horizontal direction have (1) the output value of the Y-axis always higher than that of the X-axis and (2) is detected to be higher than a second predetermined threshold value. Similarly, the second threshold value may be experimentally set to about 0.4.

Accordingly, when the voltage values (nX, nY) of the X and Y-axis fluxgates are input, which have already been normalized by the geomagnetic calculation unit 140, the control unit 210 of the photographing device 200 compares these voltage values to each other and determines whether these values meet the above-mentioned condition, so that it may determine the current pickup position of the photographing device 200. To detail this, the control unit 210 recognizes that the longitudinal pickup position is present when the output value of the Y-axis is higher than that of the X-axis and the output value of the X-axis is lower than a predetermined threshold value. On the contrary, when the output value of the Y-axis is higher than that of the X-axis and higher than a predetermined threshold value, the control unit 210 recognizes that the left horizontal pickup position is present in which the photographing device is rotated to the left direction.

When the control unit 210 recognizes the current state as the longitudinal pickup position, it controls the display unit 220 to have various menu displays or displays about the current mode displayed on one side of the display panel on which the pickup subject is to be displayed. In this state, when the output values of the X and Y-axes change which are input from the geomagnetic sensor 100 to thereby have the output value of the Y-axis higher than the second predetermined threshold value which was set in advance, the control unit 210 determines that the photographing device 200 is rotated to the left direction to carry out the horizontal pickup in the current state. As a result, it controls the display unit 220 to change the display position or the display angle of various menu displays or mode displays which are being displayed, so that it displays them again on the display panel in which the pickup subject is to be displayed at the same position and angle in the fixed direction with respect to the surface of the earth.

The above has been described, generally, with respect to a right-handed person when the photographing device is rotated to the left direction, however, the horizontal pickup may be carried out by a left-handed person who rotates the device to the right direction. When the device is rotated to the right direction, the Y-axis fluxgate is arranged in an upper direction, so that the output value of the X-axis becomes higher than that of the Y-axis. The same comparison procedure as that using the predetermined threshold values which are experimentally measured and set may also be employed in this case so that the horizontal pickup direction may be recognized. The control unit 210 has the mode display and the menu display displayed to be rotated to the left direction by 90° when it determines that the device was rotated to the right direction.

As a result, the user may readily and always recognize the mode display or the menu display in any directions including the horizontal and longitudinal directions. Accordingly, the key input unit 230 may be used to allow menus such as "pickup", "cancel", or "send the pickup" or the like to be selected.

Figure 7A:
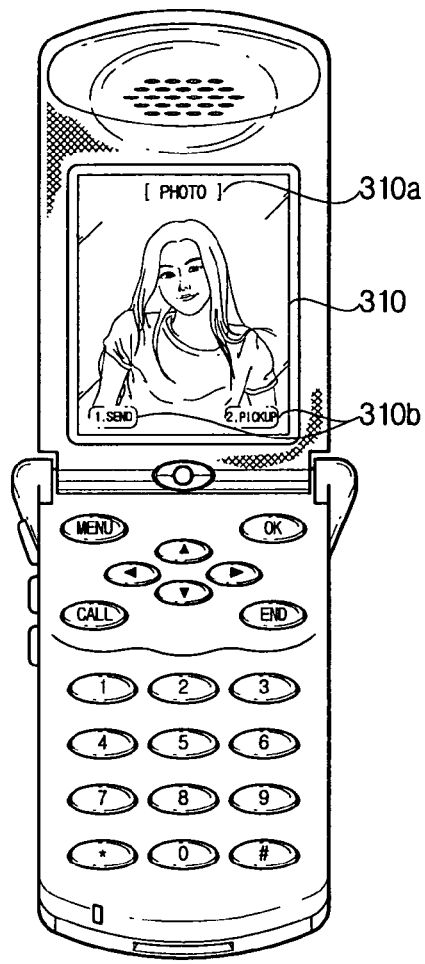
FIGS. 7A and 7B are schematic diagrams of a procedure using a camera phone in which a geomagnetic sensor is built in accordance with an exemplary embodiment of the present invention.
Figure 7B:
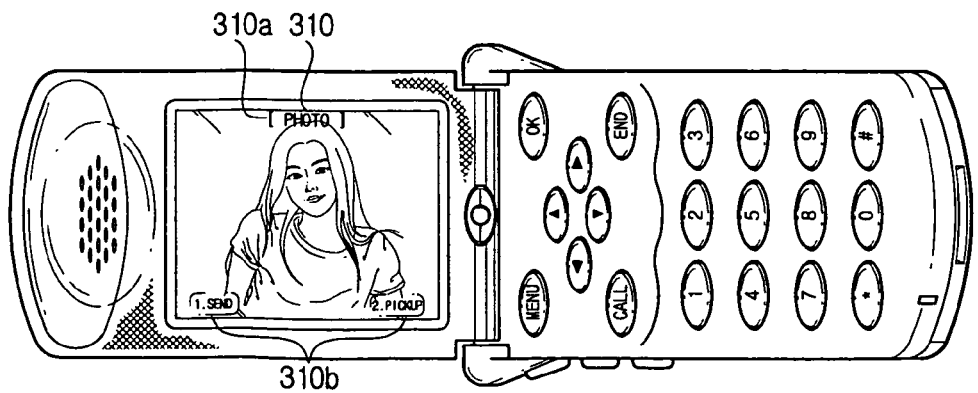

FIGS. 7A and 7B illustrate the procedure of carrying out the pickup by means of a camera phone among photographing devices in which the geomagnetic sensor is built in accordance with an exemplary embodiment of the present invention. First, FIG. 7A corresponds to the case of carrying out the pickup in a longitudinal direction, wherein the control unit 210 checks the output values of the X and Y-axes input from the geomagnetic sensor 100, and controls the display unit 220 to have the "take a picture" mode displayed on an upper position of the screen 310 and "1. send", "2. pickup" displayed on a lower position of the screen when it determines that the longitudinal pickup position is present. The display unit 220 may display such mode display or menu display as OSD forms.

FIG. 7B corresponds to the case of carrying out the pickup in the left horizontal direction when the camera phone 200 shown in FIG. 7A is rotated to the left direction, wherein the control unit 210 controls the display unit 220 to have the position of the mode display or the position of the menu display changed as shown in the same drawing when it compares the output value of the X-axis with that of the Y-axis to determine that the horizontal pickup position is present. In other words, the mode display 310a displayed on the upper position of the screen is displayed on the right position of the screen and the menu display 310b is displayed on the left position of the screen, so that the user may readily recognize the longitudinally arranged information. Accordingly, the users adjust the numeric keys or the like to select the menu and carry out the pickup.

In addition, the control unit 210 has the mode display 310a displayed on the left position of the screen and the menu display 310b displayed on the right position of the screen at the same time when it determines that the device is rotated to the right direction so that the horizontal pickup is carried out.

In particular, in the case of the portable electronic device even having a touch screen function such as a PDA, rather than the camera phone, the users may touch and select the menu arranged in a longitudinal direction, so that it is convenient for the users to see various menus in the normal display directions based on the users.

The geomagnetic sensor 100 may measure the degree of the inclination in the current state so that it may determine the degree of rotation by calculating a more correct azimuth angle. In other words, the electrical signals output from each of the fluxgates of the geomagnetic sensor 120 change in response to the inclination, which may cause an error in the value of the measured azimuth angle when the inclination significantly changes, so that the tilt compensation algorithm needs to be employed to compensate for the inclination effect. However, in order to compensate for the inclination effect by means of the tilt compensation algorithm, the pitch angle and the roll angle of the geomagnetic sensor 100 should be first measured, and the magnetic dip angle of the current position should also be measured. As a result, an additional component for measuring the pitch angle and the roll angle is required, which causes the manufacturing cost to be higher and the manufacturing to be difficult in very small-sized and very light-weighted manners, so that it is possible, for example, not to employ the tilt compensation algorithm in the exemplary embodiment of the present invention.

Figure 8:
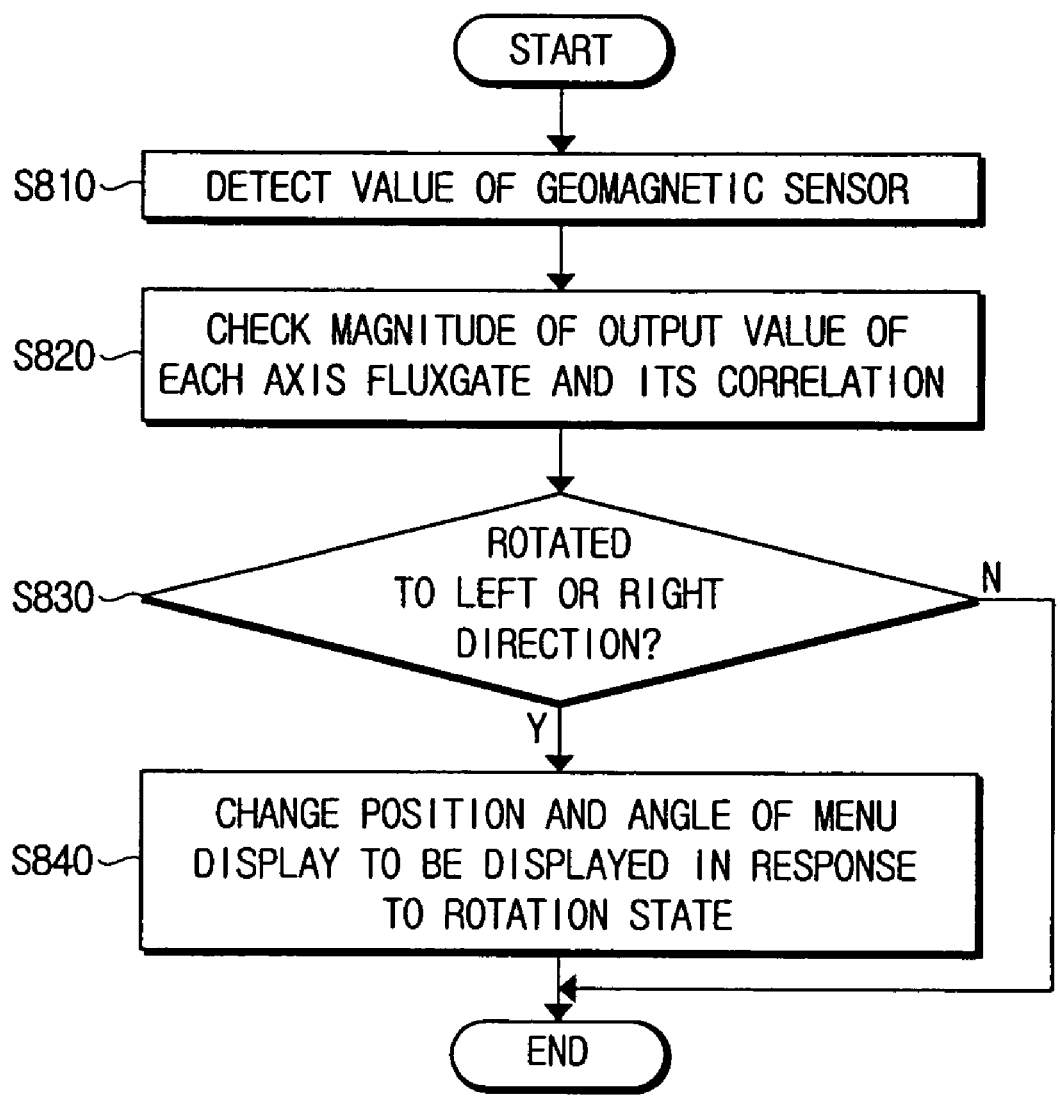
FIG. 8 is a flowchart explaining a method for changing a display state based on a rotation state of a portable electronic device in accordance with an exemplary embodiment of the present invention.

FIG. 8 is a flow chart explaining a method for displaying a menu in a photographing apparatus in accordance with an exemplary embodiment of the present invention. Referring to FIG. 8, in the case of carrying out the pickup by means of the photographing apparatus, the built-in geomagnetic sensor 100 is employed to detect a predetermined output value (operation S810).

The control unit 210 carries out the comparison for the detected output values and checks their correlation (operation S820). As a result, it checks whether the detected output values meet the predetermined conditions which are set in advance, and determines that the device is rotated to the left or the right direction or keeps its current position (operation S830).

To this end, the manufacturer of the photographing device 200 measures the output value of the geomagnetic sensor 100 under various pickup positions in advance and then extracts characteristic information such as its magnitude and correlation, so that this information may be used as conditions under respective pickup positions. To detail this, in the case of the photographing device in which the geomagnetic sensor 100 is built to be perpendicular to the camera lens direction as shown in FIGS. 6A and 6B, the output value of the Y-axis is greater than that of the X-axis and the output value of the X-axis is smaller than a first predetermined threshold value in a normal pickup position, namely, in a longitudinal pickup position, so this information may be used as a condition. On the contrary, the output value of the Y-axis is measured to be greater than that of the X-axis and is concurrently greater than a second predetermined threshold value in the case of the photographing device which is rotated to the left direction to be in a horizontal pickup position; and the output value of the X-axis is measured greater than that of the Y-axis and the output value of the Y-axis is measured smaller than that of a third predetermined threshold value in the case of the photographing device which is rotated to the right direction to be in a horizontal pickup position, so that this information above represents conditions corresponding to respective pickup positions. The first to third threshold values are changed because the magnetic dip angle is changed in response to the latitude coordinate on which the geomagnetic sensor 100 is displaced, so that these threshold values may be locally different from one another based on respective experiments. The control unit 210 checks whether respective conditions set in the above-mentioned manner are met, and determines that there exists a pickup position corresponding to the condition when the conditions are met (operation S830).

The control unit 210 has the menu display state changed at a proper position and angle based on the determination result so that it has menus or the like with the same forms displayed on the display panel 310 in a fixed direction with respect to the surface of the earth (operation S840).

When it is determined that there is no rotation (in other words, when it is determined that there exists a longitudinal pickup position), position and angle which were initially set are employed to display various menus. FIG. 7A illustrates one example of displaying the current mode state 310a and a menu 310b on the display panel 310 in the longitudinal pickup position.

When it is determined that the device is rotated to the left or right direction to be in a horizontal pickup position, the display state is also changed in response to the rotation direction. FIG. 7B illustrates the display state on the display panel 310 when the device is rotated to the left direction to be in a horizontal pickup position. Referring to FIG. 7B, the current mode state 310a and the menu 310b are rotated by 90°, respectively, and are displayed on the right and left positions of the display panel 310, respectively.

Accordingly, to whichever direction the photographing device 200 is rotated, the menu 310b and the current mode state 310a are displayed on the display panel 310 in fixed directions with respect to the surface of the earth, namely, in a direction toward the surface and in a direction opposite to the surface, respectively.

According to an exemplary embodiment of the present invention as mentioned above, based on whichever direction the user rotates the portable electronic device, various menus or mode displays to be displayed on the display panel are displayed with the same forms in a fixed direction with respect to the surface of the earth, so that the user does not need to turn his/her head to identify them. The geomagnetic sensor is employed in order to determine the degree of rotation, which has more durability against impact as compared to the acceleration sensor or the gyro sensor, and may be manufactured relatively at a low cost, and in particular, a Micro Electro Mechanical System (MEMS) technique which is rapidly developed may be employed to manufacture it as a very small sized sensor consuming a low power, which has an advantage that it may be readily built in portable electronic devices such as a cellular phone, a PDA, an electronic compass or the like.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A photographing device comprising:
   a geomagnetic sensor, including an X-axis fluxgate and a Y-axis fluxgate, which detects output values of the X and Y-axes corresponding to a geomagnetism;
   a display unit which displays a predetermined menu through a display panel; and
   a control unit which checks the output values detected by the geomagnetic sensor to determine a pickup position, and controls the display unit to change a display state of a menu in response to the determined pickup position;
   wherein the control unit determines that the pickup position is in a left horizontal pickup direction if the output value of the Y-axis is greater than the output value of the X-axis and a first predetermined threshold value.

2. The photographing device as recited in claim 1, wherein the geomagnetic sensor comprises:
   a geomagnetism detection module which includes the X-axis fluxgate which outputs an electrical signal and the Y-axis fluxgate, which is orthogonal to the X-axis fluxgate and which outputs an electrical signal;
   a signal processing unit which converts the electrical signals output from each of the X and Y-axis fluxgates to the respective output values of the X and Y-axes and outputs said respective output values; and
   a geomagnetism calculation unit which normalizes the respective output values of the X and Y-axes to values within respective predetermined ranges.

3. The photographing device as recited in claim 2, wherein the control unit determines that there exists a pickup position corresponding to a predetermined condition if magnitudes of the normalized output values of the X and Y-axes meet the predetermined condition.

4. The photographing device as recited in claim 3, wherein the control unit uses the magnitudes of the normalized output values of the X and Y-axes as the condition under respective pickup positions which are extracted, in advance, by measuring output values of the X and Y-axes while changing the pickup positions of the photographing device.

5. The photographing device as recited in claim 4, wherein the geomagnetic sensor is mounted so as to have the X-axis fluxgate and the Y-axis fluxgate formed in a pickup direction of the photographing device and in a direction perpendicular to the pickup direction of the photographing device, respectively.

6. The photographing device as recited in claim 5, wherein the control unit determines that the pickup position is in a longitudinal pickup direction if the normalized output value of the Y-axis is greater than the normalized output value of the X-axis and the output value of the X-axis is smaller than a second predetermined threshold value.

7. The photographing device as recited in claim 6, wherein the control unit determines that the pickup position is in a right horizontal pickup direction if the normalized output value of the X-axis is greater the normalized output value of the Y-axis and the normalized output value of the Y-axis is smaller than a third predetermined threshold value.

8. The photographing device as recited in claim 1, wherein the control unit changes a position and an angle of the menu display to correspond to the change of the pickup position, so that the menu is displayed with a same form on the display panel in a fixed direction with respect to a surface of the earth.

9. A portable electronic device comprising:
   a geomagnetic sensor which includes an X-axis fluxgate and a Y-axis fluxgate, and detects a output values of the X and Y-axes corresponding to a geomagnetism;
   a control unit which checks the output values detected by the geomagnetic sensor, and determines that there is an inclination corresponding to a predetermined condition if the output value meets the predetermined condition; and
   a display unit which displays a predetermined menu on a display panel, and changes a display state of the menu in response to the inclination to display the menu with a same form on the display panel in a fixed direction with respect to a surface of the earth;
   wherein the control unit determines that the pickup position is in a left horizontal pickup direction if the output value of the Y-axis is greater than the output value of the X-axis and a predetermined threshold value.

10. The portable electronic device as recited in claim 9, wherein the geomagnetic sensor comprises:
    a geomagnetism detection module which includes the X-axis fluxgate which outputs an electrical signal and the Y-axis fluxgate, which is orthogonal to the X-axis fluxgate and outputs an electrical signal;
    a signal processing unit which converts the electrical signals output from the X and Y-axis fluxgates to the respective output values of the X and Y-axes and outputs said respective output values; and
    a geomagnetism calculation unit which normalizes the output values of the X and Y-axes to values in respective predetermined ranges.

11. A method for displaying a menu of a photographing device having a display panel, an X-axis fluxgate, and a Y-axis fluxgate, the method comprising:
    (a) using the X and Y-axes fluxgates to detect output values of the X and Y-axes corresponding to a geomagnetism;
    (b) checking whether the output values of the X and Y-axes meets a predetermined condition to determine a pickup position of the photographing device; and
    (c) displaying a predetermined menu on the display panel, and changing a display state of the menu in response to the pickup position to display the menu with a same form on the display panel in a fixed direction with respect to the surface of the earth;

wherein (b) comprises:
  determining that the pickup position is in a left horizontal pickup direction if the output value of the Y-axis is greater than the output value of the X-axis and a predetermined threshold.

12. The method as recited in claim 11, wherein (a) comprises:
  detecting electrical signals corresponding to a geomagnetism from the X-axis fluxgate and the Y-axis fluxgate;
  converting the electrical signals to the output values of the X and Y-axes and outputting said output values; and
  normalizing the output values of the X and Y-axes to values in respective predetermined ranges.

13. The method as recited in claim 12, wherein (b) further comprises using magnitude information of the normalized output values of the X and Y-axes as the condition under respective pickup positions which are extracted, in advance, by measuring the output values of the X and Y-axes while changing the pickup position of the photographing device.

* * * * *